United States Patent
Yu et al.

(10) Patent No.: US 6,526,370 B1
(45) Date of Patent: Feb. 25, 2003

(54) MECHANISM FOR ACCUMULATING DATA TO DETERMINE AVERAGE VALUES OF PERFORMANCE PARAMETERS

(75) Inventors: Ching Yu, Santa Clara, CA (US); Jerry Kuo, San Jose, CA (US); Jeffrey Dwork, San Jose, CA (US); John M. Chiang, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/244,416

(22) Filed: Feb. 4, 1999

(51) Int. Cl.[7] ................................................. G06F 11/30
(52) U.S. Cl. ........................ 702/182; 702/176; 709/224
(58) Field of Search ........................... 702/79, 108, 122, 702/124, 125, 176–180, 182–189; 709/220, 223, 224, 228; 712/227, 231; 714/4, 39

(56) References Cited

U.S. PATENT DOCUMENTS

| | | | | |
|---|---|---|---|---|
| 4,009,371 A | * | 2/1977 | Hamilton et al. | 377/52 |
| 4,142,238 A | * | 2/1979 | Brandt et al. | 702/176 |
| 4,865,717 A | * | 9/1989 | Setter et al. | 204/412 |
| 4,965,717 A | * | 10/1990 | Cutts, Jr. et al. | 714/12 |
| 5,247,626 A | * | 9/1993 | Firoozmand | 709/212 |
| 5,426,741 A | * | 6/1995 | Butts et al. | 710/18 |
| 5,822,618 A | * | 10/1998 | Ecclesine | 710/18 |
| 5,826,015 A | * | 10/1998 | Schmidt | 709/229 |
| 5,914,727 A | * | 6/1999 | Horan et al. | 345/503 |
| 5,970,439 A | * | 10/1999 | Levine et al. | 702/186 |
| 6,018,803 A | * | 1/2000 | Kardach | 713/323 |
| 6,061,305 A | * | 5/2000 | Williams | 368/113 |
| 6,078,919 A | * | 6/2000 | Ginzburg et al. | 707/10 |
| 6,189,066 B1 | * | 2/2001 | Lowe et al. | 710/260 |
| 6,195,758 B1 | * | 2/2001 | Lundh et al. | 713/500 |

* cited by examiner

Primary Examiner—Marc S. Hoff
Assistant Examiner—Manuel L. Barbee

(57) ABSTRACT

A system for accumulating data relating to performance parameters of a data communication system is provided in order to determine average values of these parameters. The system comprises multiple registers used for calculating average values of particular performance parameters, such as bus latency, interrupt latency, receive service routine time, and receive frame copy time. Each of the registers contains an event counter and a timer. The event counter increments upon occurrence of an event relating to the performance parameter accumulated by the corresponding register. The timer is activated by the occurrence of the event, and increments at a predetermined rate until the event comes to an end. The timer resumes incrementing when the next event occurs. As a result, the CPU is enabled to determine an average value of a particular parameter per an event relating to this parameter.

20 Claims, 4 Drawing Sheets

| bit #0 | bit #24 | bit #31 |
|---|---|---|
| Bus Latency Timer | Bus Latency Event Counter | |
| Interrupt Latency Timer | Interrupt Latency Event Counter | ⎫ 17a |
| Receive End of Copy Timer | Receive End of Copy Event Counter | |
| Receive Frame Copy Timer | Receive Frame Copy Event Counter | |

| | bit #24 | bit #31 |
|---|---|---|
| Bus Latency Timer | Bus Latency Event Counter | 17a |
| Interrupt Latency Timer | Interrupt Latency Event Counter | |
| Receive End of Copy Timer | Receive End of Copy Event Counter | |
| Receive Frame Copy Timer | Receive Frame Copy Event Counter | | bit #0

Figure 2

MECHANISM FOR ACCUMULATING DATA TO DETERMINE AVERAGE VALUES OF PERFORMANCE PARAMETERS

FIELD OF INVENTION

The present invention relates to data communication networks, and in particular, to a system for accumulating data relating to various performance parameters, in order to determine their average values.

BACKGROUND ART

The growth in computer applications that require heavy data traffic and the increasing availability of high-speed transmission lines and intelligent communication switches create a need for computer systems able to manage a huge amount of data at high rates. High-speed communication networks may require a central processing unit (CPU) to be interrupted at rates of 20,000–100,000 interrupts per second in response to hundreds various events.

For example, an external CPU may periodically read various registers of a network controller to receive information on operating conditions and performance parameters of the controller. If the CPU accesses the controller registers at a high rate, processing bottlenecks may occur. However, if two successive CPU accesses to a particular register are separated by a relatively long time interval, values of parameters stored in the register may substantially change.

To optimize the network performance, it would be desirable to provide the CPU with data that enable the CPU to determine average values of performance parameters over a time interval between two successive CPU accesses.

DISCLOSURE OF THE INVENTION

Accordingly, a primary object of the present invention is to provide a system for accumulating data that enable a host to determine average values of performance parameters.

The above and other advantages of the invention are achieved, at least in part, by providing a system for accumulating information that comprises an event counter for counting the number of events relating to network parameters, and a timer for determining total time during which the events take place. In response to the determined number of events and total time, a host calculates an average value of the network parameters as a ratio of the total time to the number of events.

In accordance with a preferred embodiment of the invention, the timer may increment at a predetermined rate while an event relating to a network parameter occurs. The timer stops when the event comes to an end, and is activated to continue incrementing at the predetermined rate upon occurrence of a next event relating to the network parameter.

In accordance with a first aspect of the invention, the counter may count bus latency events relating to latency time of a system bus. The counter increments every time when a request for access to the system bus is produced. The timer is activated by the request and stops when the request is granted.

In accordance with another aspect of the invention, the counter may count interrupt latency events relating to interrupt latency time of a network controller. The counter increments every time when a request for interrupt of the host is produced. The timer is activated by the request and stops when the request is terminated.

In accordance with a further aspect of the invention, the counter may count receive service events relating to receive service time of a network controller. The counter increments every time when a first element of a frame is received by the network controller from a network. The timer is activated when the first element of the frame is received from the network, and stops when the frame is completely written to a system memory.

In accordance with another aspect of the invention, the counter may count events relating to time of transferring a frame from a buffer to a system memory. In this case, the counter increments every time when a first element of a received frame is written to the system memory. The timer is activated when the first element of the received frame is written to the system memory, and stops when the received frame is completely written to the system memory.

In accordance with a method of the present invention the following steps are carried out for accumulating data to determine average values of parameters:

counting number of events relating to the parameters, and determining total time during which the events occur to calculate an average value of the parameters as a ratio of the total time to the number of events.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 2 illustrates registers used to accumulate data for averaging purposes.

BEST MODE FOR CARRYING OUT THE INVENTION

The present invention will be described with the example of a network interface in a packet switched network, such as an Ethernet (IEEE 802.3) network. It will become apparent, however, that the present invention is applicable to any output driver in any data processing system.

Figure 1A:
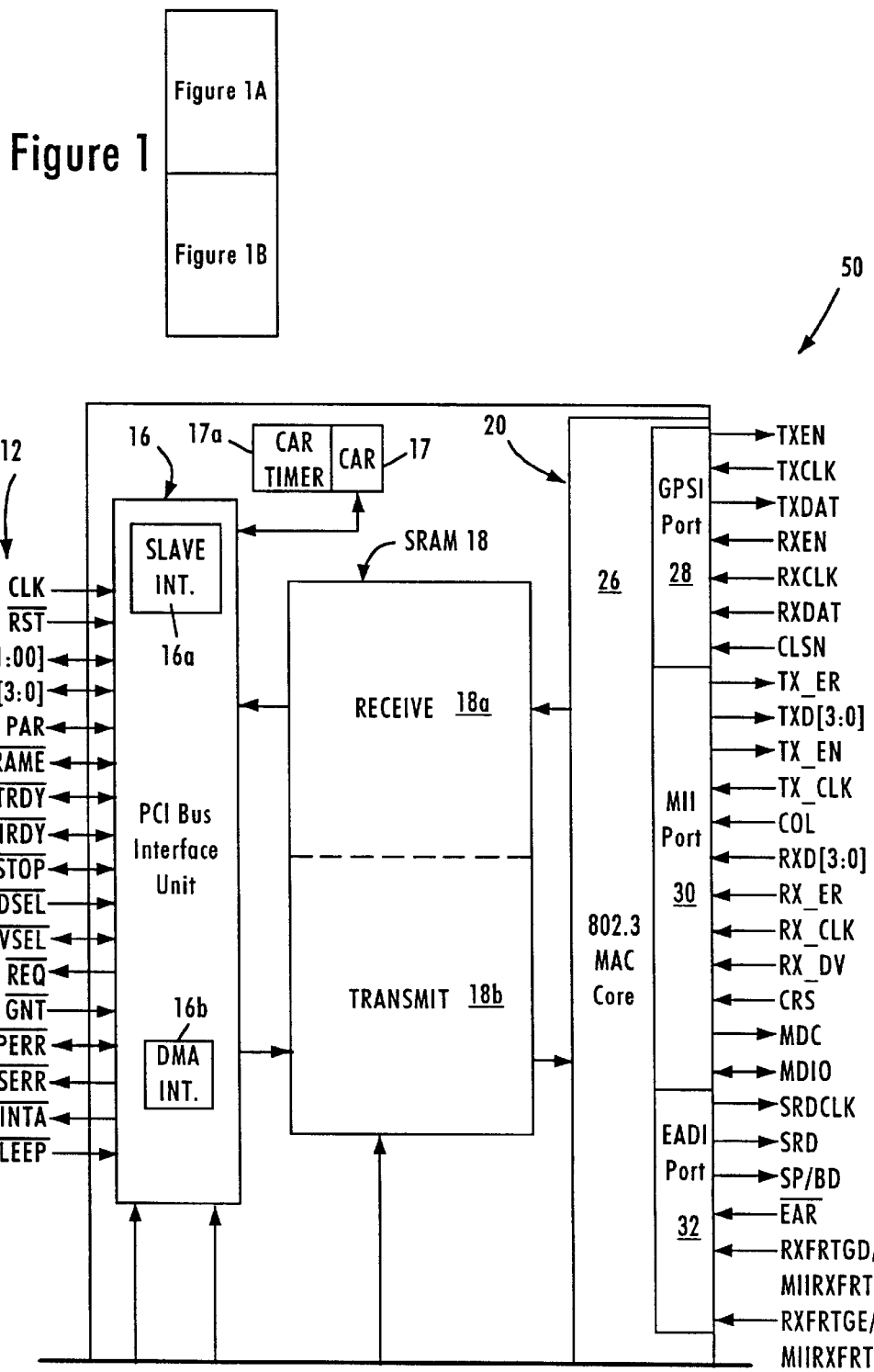
FIG. 1 is a block diagram illustrating an exemplary network interface, which may be used for implementing the present invention.
Figure 1B:
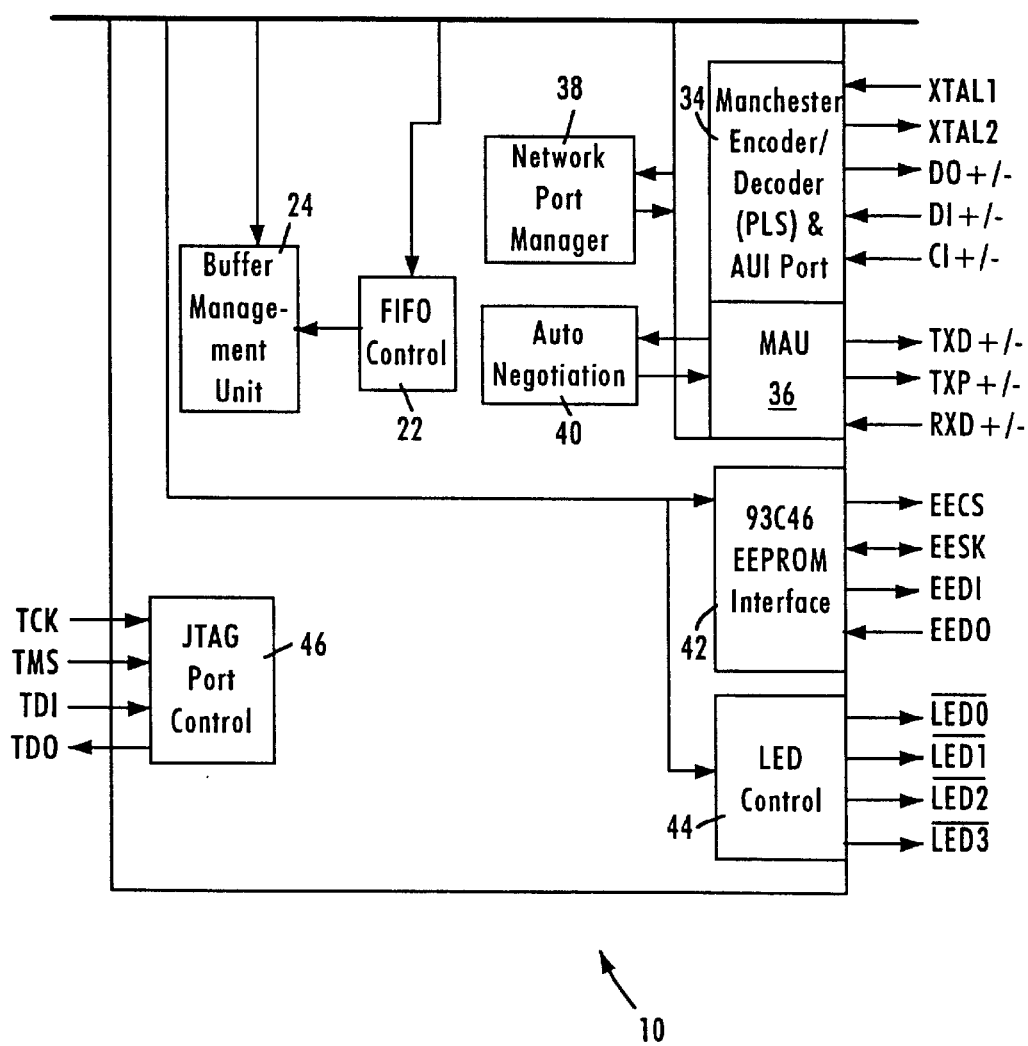

FIG. 1 is a block diagram of an exemplary network interface 10 that accesses the media of an Ethernet (ANSI/IEEE 802.3) network.

The network interface 10, preferably, a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface portion 20. The PCI bus interface unit 16 may provide an interface with an external CPU or other host via the PCI local bus. The PCI bus interface unit 16 may include a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

In accordance with the PCI local bus specification, revision 2.1, the PCI bus interface unit 16 has an interrupt request output INTA/ used for supplying the CPU or a host with an interrupt request signal. The network interface 10 produces the interrupt request signal to indicate that one or more of status flags are set. The status flags may represent such events as receive or transmit interrupt, system error, user interrupt, etc. A Control and Register (CAR) block 17 contains registers that support interactions between the PCI bus interface 16 and other blocks of the network interface 10. The CAR block 17 has an interface to the PCI bus interface 16 to allow read and write accesses by the host CPU to the registers. For example, the CAR block comprises a command register that decodes commands from the CPU and sends command signals to other blocks of the network interface 10. The CAR block 17 is responsible for interrupt generation and batching, and contains counters and timers for controlling interrupts and providing information to the CPU regarding latency and access time. Also, the CAR block 17 generates reset signals supplied to all other blocks of the interface 10, and provides input/output control.

The memory portion 18 includes a 16-bit SRAM implemented directly on the network interface chip 10. According to the disclosed embodiment, the SRAM 18 may be accessed in a random access manner under the control of a first in, first out (FIFO) control unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory controller 22 are shown as discrete components, the two units may be integrated to form a memory management unit controlling all transfers of data to and from the memory unit 18.

The network interface portion 20 includes a media access control (MAC) core 26, a general purpose serial interface (GPSI) 28, a media independent interface (MII) 30 for connecting to an external 10 Mb/s or 100 Mb/s physical transceiver (PHY), an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking is performed in accordance with the IEEE 802.3 protocols, and may include link and programming information exchange at the MII layer using a management data clock (MDC), and management data input/output (MDIO) paths defined in the IEEE 802.3 standard.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface status registers (not shown). The network interface 10 also includes an IEEE 1149.1-compliant JTAG boundary scan test access port interface 36.

The EEPROM interface 42 connects to an EEPROM on either a network interface adapter card or the motherboard of the host computer via a serial interface link. The EEPROM (not shown in FIG. 1) will be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down.

As discussed above, the CAR block 17 contains registers that can be accessed by the CPU via the PCI bus interface unit 16. In particular, the CAR block 17 comprises a CAR_TIMER sub-block 17a combining counters and timers that enable the CPU to determine average values of such performance parameters as bus latency, interrupt latency, receive service routine time, and receive frame copy time.

The CPU may access CAR_TIMER sub-block 17a for read and write operations via the PCI slave interface 16a. As illustrated in FIG. 2, the CAR_TIMER sub-block 17a includes registers that accumulate performance parameters of the network interface 10 for averaging purposes. For example, the CAR_TIMER sub-block 17a may comprise a bus latency register, an interrupt latency register, a receive end of copy timer register, and a receive frame copy register.

Each of the registers contains an event counter and a timer. The event counter increments upon occurrence of an event relating to the performance parameter accumulated by the corresponding register. The event counter is reset when the CPU reads its count.

The timer is activated by the occurrence of the event, and increments at a rate established by a local clock, for example, every 0.1 μs. The timer stops when the event comes to an end, and resumes counting when the next event occurs. The timer is reset when the CPU reads its content. The counter and the timer may be programmed via the EEPROM interface 42.

For example, the bus latency register provides the CPU with information required to calculate the average latency of a system bus, for example, the PCI bus. In accordance with the PCI local bus specification, revision 2.1, the PCI bus interface unit 16 has a bus request input/output pin REQ/, pin and a bus grant input pin GNT/. The network interface 10 asserts the REQ/ pin when it requests access to the system bus as a bus master. The host CPU supplies to the GNT/ pin a signal indicating that the requested access to the bus has been granted to the network interface 10. The time interval between the assertion of the pin REQ/ and the activation of the pin GNT/ represents the latency of the system bus.

The bus latency register may comprise 32 bits. Bits [31:24] may represent an 8-bit bus latency event counter. Bits [23:0] may represent a 24-bit bus latency counter. The bus latency event counter increments each time the network interface asserts the pin REQ/ to count the number of bus latency events. The bus latency timer starts counting upon the assertion of the pin REQ/ and increments every 0.1 μs during the time when the network interface 10 waits for access to the PCI bus. The bus latency timer stops when the pin GNT/ is activated by the CPU to indicate that the PCI bus access has been granted.

Figure 3:
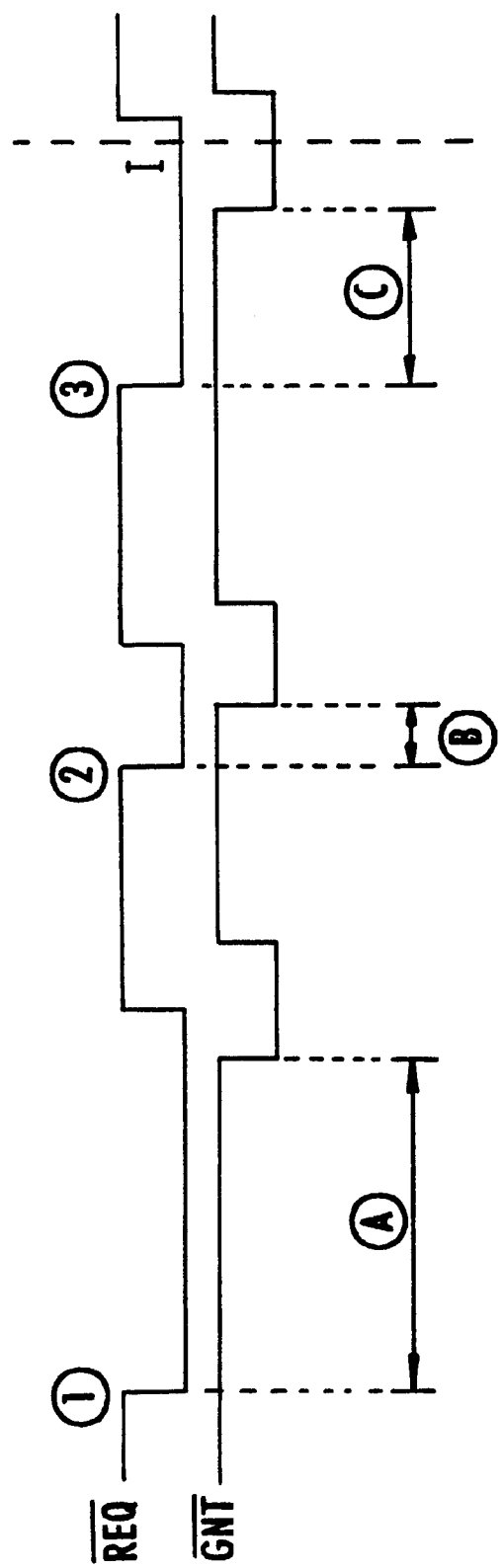
FIG. 3 shows timing diagrams illustrating the operation of a bus latency register.

As illustrated in FIG. 3, bus latency event 1 is represented by the first negative edge of a bus request signal supplied via the pin REQ/ to the CPU. When the negative edge of the bus request signal is detected, the bus latency event counter increments. At the same moment, the bus latency timer is activated. The timer increments every 0.1 μs until the negative edge of a bus grant access signal is detected at the pin GNT/. Thus, the bus latency timer determines the bus latency corresponding to event 1. This bus latency is represented by time interval A between the negative edge of the bus request signal corresponding to event 1, and the next negative edge of the bus grant access signal.

The next negative edge of the bus request signal represents next bus latency event 2. The bus latency event counter increments upon detecting event 2. The bus latency timer is activated by the request signal edge to continue counting, and stops at the next negative edge of the bus grant access signal to determine time interval B representing the bus latency corresponding to event 2.

The following negative edge of the bus request signal increments the bus latency event counter as bus latency event 3. At the same time, the bus latency timer determines time interval C representing the bus latency corresponding to event 3.

Thus, the bus latency register accumulates data about bus latency events, and bus latency values corresponding to these events. When the CPU performs read access to the bus latency register at a moment I, the register provides the CPU with the total number of accumulated events equal to 3, and with the total accumulated value of the bus latency equal to the sum of time intervals A, B and C. Thus, the CPU is enable to determine the average bus latency value per a bus latency event. The bus latency counter and bus latency timer are reset when the CPU reads the bus latency register. Thereafter, they resume their operations.

The interrupt latency register provides the CPU with information required to determine the average interrupt latency of the network interface 10. The interrupt latency register contains an 8-bit interrupt latency event counter that counts the number of interrupt latency events, and a 24-bit interrupt latency timer for determining interrupt latency time.

The interrupt latency event counter is incremented each time when the interrupt request output pin INTA/ of the PCI bus interface 16 is asserted. The interrupt latency timer is activated upon the assertion of the pin NTA/. The timer increments every 0.1 μs while the pin INTA/ is asserted, and stops when the pin NTA/ is de-asserted. The interrupt latency timer resumes counting as soon as the pin INTA/ is asserted again. The interrupt latency event counter and interrupt latency timer are reset when the CPU reads their content.

Thus, the interrupt latency counter accumulates information about the number of interrupt latency events which occur when the pin INTA/ is asserted. The interrupt latency timer determines the total interrupt latency time for the accumulated interrupt latency events. Accordingly, the CPU is enabled to determine the average latency time per an interrupt request.

The receive end of copy timer register provides the CPU with information required to calculate the average time of receive service routine. This register comprises a receive end of copy event counter that counts the number of receive service routine events, and a receive end of copy timer that determines receive service routine time.

The receive end of copy event counter increments each time when the last byte of a receive frame is received from the network. The receive end of copy timer is activated when the last byte of a receive frame is received from the network. The timer increments every 0.1 μs until the last byte of the receive frame is written to the system memory, or the frame is flushed. The timer resumes counting when the last byte of the next receive frame is received from the network. Thus, the CPU is enabled to calculate the average service routine time per a receive frame.

The receive frame copy register provides the CPU with information needed to calculate the average time required to copy a frame from the receive buffer 18a to the system memory. This register comprises a receive frame copy event counter that counts the number of receive frames written to the system memory, and the receive frame copy timer that determines receive frame copy time.

The receive frame copy event counter increments each time when the first byte of a receive frame is written to the system memory. The receive frame copy timer is activated when the first byte of a receive frame is written to the system memory. The timer increments every 0.1 μs until the last byte of the receive frame is written to the system memory. The receive frame copy timer resumes counting when the first byte of the next receive frame is written to the system memory. Thus, the CPU is enabled to determine the average time of transferring a receive frame from the buffer memory 18b to the system memory, per a receive frame.

There, accordingly, has been described a system for accumulating data relating to performance parameters of a data communication system, in order to determine average values of these parameters. The system comprises multiple registers used for calculating average values of particular performance parameters, such as bus latency, interrupt latency, receive service routine time, and receive frame copy time. Each of the registers contains an event counter and a timer. The event counter increments upon occurrence of an event relating to the performance parameter accumulated by the corresponding register. The timer is activated by the occurrence of the event, and increments at a predetermined rate until the event comes to an end. The timer resumes incrementing when the next event occurs. As a result, the CPU is enabled to determine an average value of a particular parameter per an event relating to this parameter.

In this disclosure, there are shown and described only the preferred embodiments of the invention, but it is to be understood that the invention is capable of changes and modifications within the scope of the inventive concept as expressed herein.

What is claimed is:

1. In a data communications network having a system memory and controlled by a host, a system for accumulating information to enable the host to determine average values of network parameters, comprising:
   an event counter for counting number of events relating to said network parameters, and
   a timer for determining total time during which said events take place,
   said host being responsive to said number of events and said total time for calculating an average value of said network parameters as a ratio of said total time to said number of events.

2. The system of claim 1, wherein said timer increments at a predetermined rate while an event relating to a network parameter occurs.

3. The system of claim 2, wherein said timer stops when said event comes to an end, and resumes incrementing at said predetermined rate upon occurrence of a next event relating to the network parameter.

4. The system of claim 3, wherein said counter counts bus latency events relating to latency time of a system bus.

5. The system of claim 4, wherein said counter increments every time when a request for access to said system bus is produced.

6. The system of claim 5, wherein said timer is activated by said request and stops when said request is granted.

7. The system of claim 3, wherein said counter counts interrupt latency events relating to interrupt latency time of a network controller.

8. The system of claim 7, wherein said counter increments every time when a request for interrupt of said host is produced.

9. The system of claim 8, wherein said timer is activated by said request and stops when said request is terminated.

10. The system of claim 3, wherein said counter counts receive service events relating to receive service time of a network controller.

11. The system of claim 10, wherein said counter increments every time when a first element of a frame is received by said network controller from said network.

12. The system of claim 11, wherein said timer is activated when said first element of said frame is received from said network, and stops when the frame is completely written to a system memory.

13. The system of claim 3, wherein said counter counts events relating to a time of transferring a frame from a buffer to a system memory.

14. The system of claim 13, wherein said counter increments every time when a first element of a received frame is written to the system memory.

15. The system of claim 14, wherein said timer is activated when said first element of said received frame is written to the system memory, and stops when said received frame is completely written to the system memory.

16. The system of claim 1, further comprising multiple registers accessible by the host for accumulating the network parameters for averaging purposes.

17. The system of claim 16, wherein each of said registers represents a particular network parameter and contains said event counter and said timer.

18. The system of claim 17, wherein said event counter increments upon occurrence of an event relating to the network parameter accumulated by a corresponding register, and is reset when the host reads a count of said event counter.

19. The system of claim 18, wherein said timer is activated by occurrence of the event relating to the network parameter accumulated by the corresponding register, and is reset when the host reads content of said timer.

20. In a data communications system controlled by a host, a method of accumulating data to determine average values of parameters, comprising the steps of:

counting number of events relating to the parameters, determining total time during which the events occur, and calculating by the host an average value of the parameters as a ratio of the total time to the number of events.

* * * * *